United States Patent
Wang et al.

(10) Patent No.: US 6,684,317 B2
(45) Date of Patent: Jan. 27, 2004

(54) METHOD OF ADDRESSING SEQUENTIAL DATA PACKETS FROM A PLURALITY OF INPUT DATA LINE CARDS FOR SHARED MEMORY STORAGE AND THE LIKE, AND NOVEL ADDRESS GENERATOR THEREFOR

(75) Inventors: Xiaolin Wang, Concord, MA (US); Satish Soman, Westboro, MA (US); Benjamin Marshall, Stowe, MA (US); Subhasis Pal, Winchester, MA (US)

(73) Assignee: Axiowave Networks, Inc., Marlborough, MA (US)

( * ) Notice: Subject to any disclaimer, the term of this patent is extended or adjusted under 35 U.S.C. 154(b) by 221 days.

(21) Appl. No.: 10/026,166

(22) Filed: Dec. 21, 2001

(65) Prior Publication Data

US 2003/0120894 A1 Jun. 26, 2003

(51) Int. Cl.[7] ............................................. G06F 12/08
(52) U.S. Cl. ....................................................... 711/218
(58) Field of Search .......................... 711/200, 217, 711/218, 220

(56) References Cited

U.S. PATENT DOCUMENTS 4,748,618 A * 5/1988 Brown et al. ................ 370/419
6,622,232 B2 * 9/2003 Schroeder ................... 711/219

* cited by examiner

*Primary Examiner*—Kevin L. Ellis
(74) *Attorney, Agent, or Firm*—Rines and Rines (57) ABSTRACT

A sequential data packet addressing technique and system, particularly adapted for shared memory output-buffered switch fabrics and related memories, using a ring of successive subaddress generators each assigning addresses for predetermined size data byte packets received in successive time slots, and creating therefrom super packets ordered based on arrival time; and sequentially allocating memory therefor in the shared memory without overlap among the packets and with no holes between adjacent packets, and assigning addresses for the individual packets in the super packets upon the assigning of an address in the memory for each super packet.

25 Claims, 7 Drawing Sheets

METHOD OF ADDRESSING SEQUENTIAL DATA PACKETS FROM A PLURALITY OF INPUT DATA LINE CARDS FOR SHARED MEMORY STORAGE AND THE LIKE, AND NOVEL ADDRESS GENERATOR THEREFOR

FIELD

The present invention relates to systems and techniques for assigning memory storage addresses to sequential data packets from pluralities of input data line cards, or other sources, being more particularly directed to such addressing for writing the data packets into shared memory selections preferably of an output-buffered switch fabric as of the type described in copending U.S. patent application Ser. No. 09/941,144, entitled: METHOD OF SCALABLE NON-BLOCKING SHARED MEMORY OUTPUT-BUFFERED SWITCHING OF VARIABLE LENGTH DATA PACKETS FOR PLURALITIES OF PORTS AT FULL LINE RATE, AND APPARATUS THEREFOR, filed Aug. 28, 2001 and of common assignee herewith, and such that there is no overlap among the packets and no holes or gaps between adjacent data packets.

BACKGROUND

While the addressing methodology of the invention may be of more general application as well, it will be illustratively described herein with reference to its preferred and best mode use with output-buffered switch fabrics of the above-mentioned type, wherein a central shared memory architecture is employed, comprised of a plurality of similar successive data memory channels defining a memory space, with fixed limited times of data distribution from the input ports successively into the successive memory cells of the successive memory channels, and in striped fashion across the memory space. This enables non-blocking shared memory output-buffered data switching, with the data stored across the memory channels uniformly. By so limiting the times of storing data from an input port in each successive memory channel, the problem is admirably solved of guaranteeing that data is written into memory in a non-blocking fashion across the memory space and with bounded delay.

This technique, as explained in said copending application, embraces a method of receiving and outputting a plurality m of queues of data traffic streams to be switched from data traffic line card input ports to output ports. A plurality n of similar successive data memory channels, is provided, each having a number of memory cells defining the shared memory space assigned to the m queues. Buffering is effected for m memory cells, disposed in front of each memory channel to receive and buffer data switched thereto from line card traffic streams, and providing sufficient buffering to absorb a burst from up to n line cards. Successive data is distributed in each of the queues during fixed limited times only to corresponding successive cells of each of the successive memory channels and, as before stated, in striped fashion across the memory space, thereby providing the non-blocking shared memory output-buffered data switching I/O (input/output) ports. Each packet from an input port gets an address in the destination queue from an address generator, defining the location in the shared memory in which the packet will be stored. Such use of an output-buffered switch fabric enables packets destined for a queue to come from all input ports; and all these packets are written into the shared memory such that, as before mentioned, there is no overlap among packets and no holes or gaps between adjacent packets. The address of every packet, accordingly, depends upon all the packets that have been previously assigned an address, and the packets must be assigned sequentially.

As an example, the system embodying the shared memory operating with the address generating methodology of the present invention can support minimum 40 byte packets with no impact on the switch fabric performance, receiving from each 10 Gbps port, a 40 byte packet every 40 ns fixed time slot, and with capability to assign addresses for 64 packets every 40 ns, as where all these packets belong to the same queue.

The invention accomplishes this without attempting to push technology as has been proposed in other prior approaches. To the contrary, the present invention develops a parallel processing algorithm, as later detailed, with its address generator being scalable for both port count and bandwidth.

OBJECT OF INVENTION

A principal object of the present invention, therefore, is to provide a new and improved address generating methodology particularly, though not exclusively, suited to enable packet addressing in an output-buffered shared memory switch fabric, and by a novel parallel processing scalable approach, and without overlap among the sequentially addressed packets, and with no holes or gaps between adjacent packets.

A further object is to provide a novel address generator for carrying out the method of the addressing technique of the invention, and embodying a ring structure of successively connected subaddress generators, with memory allocation effected sequentially from subaddress generator to subaddress generator along the ring.

Still another object is to provide such novel address generation with successive addressing effected at successive subaddress generators of the ring by adding the current size of packets thereat to the address assignment of the preceding subaddress generator, and with the address of a packet thus depending upon all packets that have previously been assigned an address, and with such assignment occurring sequentially.

Other and further objects will be explained hereinafter and are more particularly detailed in the accompanying claims.

DRAWINGS

The invention will now be described with reference to the accompanying drawings.

SUMMARY

In summary, however, from one of its important aspects, the invention embraces a method of addressing sequential data packets from a plurality of input data line cards to enable their memory storage in successive shared memory block sections of an output buffered switch fabric, each assigned to a queue dedicated for an output port, that comprises, connecting a plurality of similar subaddress generators successively in a closed ring structure, with each subaddress generator being capable of assigning addresses for predetermined size data byte packets of input data traffic received in a plurality of successive time slots to produce packet composition into super packets that are ordered based on time of arrival; allocating a continuous memory block for a super packet by assigning an initial super packet address in the destination queue from a subaddress generator; thereupon generating the starting address of the next super packet by adding the super packet size to said initial starting address and moving to the next subaddress generator sequentially along the successive subaddress generators of the ring, thereby sequentially allocating memory in the shared memory sections from subaddress generator to subaddress generator along said ring; and, upon the assigning of an address to each super packet, producing packet decomposition at the corresponding subaddress generator by simultaneously assigning addresses for the individual packets in the super packet, based on their arrival order.

Preferred embodiments and best mode configurations are later detailed.

DESCRIPTION OF PREFERRED EMBODIMENTS OF INVENTION

Figure 8:
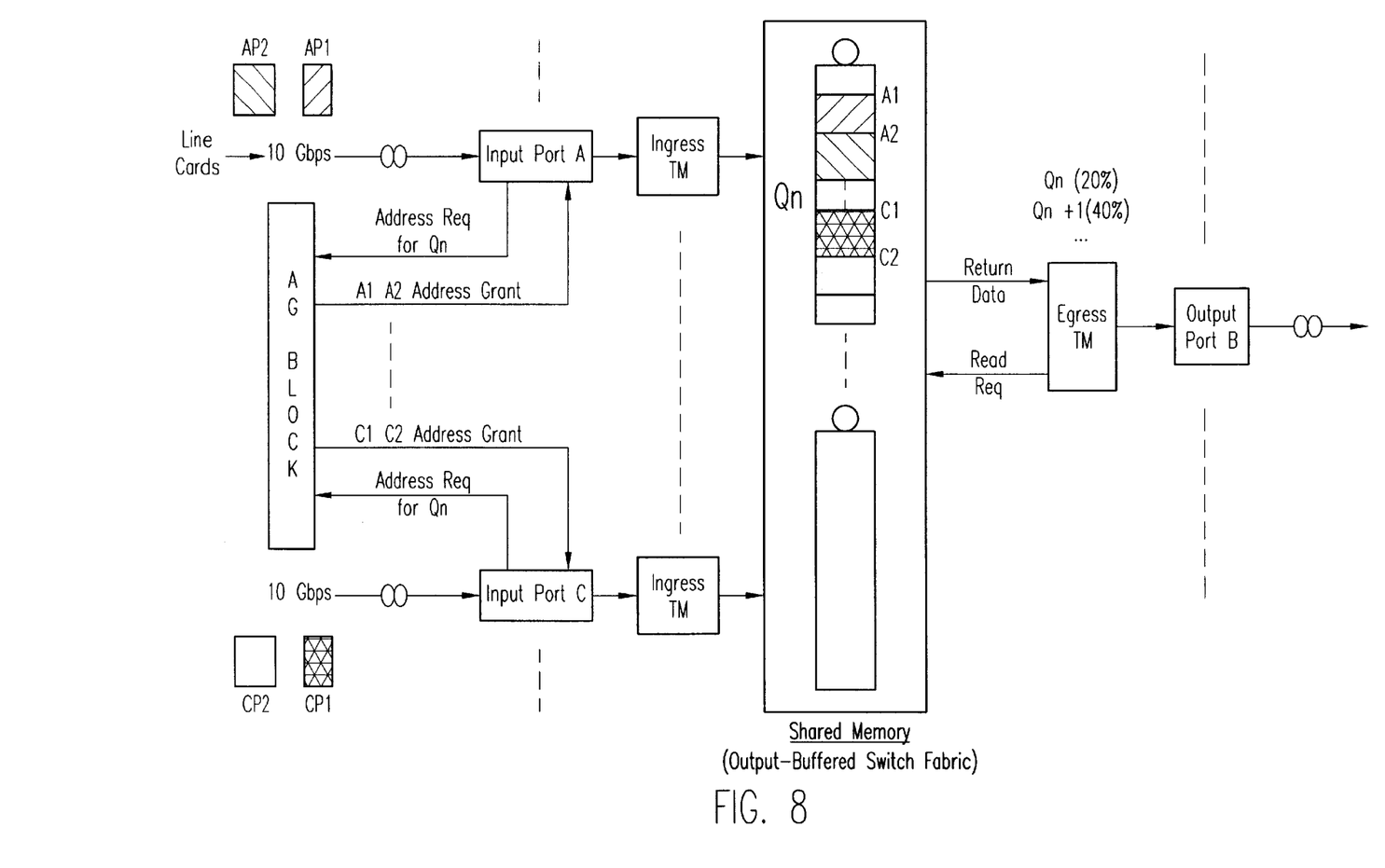
FIG. 8 of which is an overall block operational diagram of the preferred overall system using the present invention as the addressing generator for the before-described output-buffered shared memory switch fabric.

Referring to FIG. 8, an overall system (termed by applicants' assignee as "the Agora ESF" —electronic switch fabric—) is shown comprising the before-described output-buffered shared memory at M, connected to be addressed by the address generator system AGS of the present invention. Before proceeding to describe the complete system, however, it is believed useful to consider first the address-generating system of the present invention.

Figure 1:
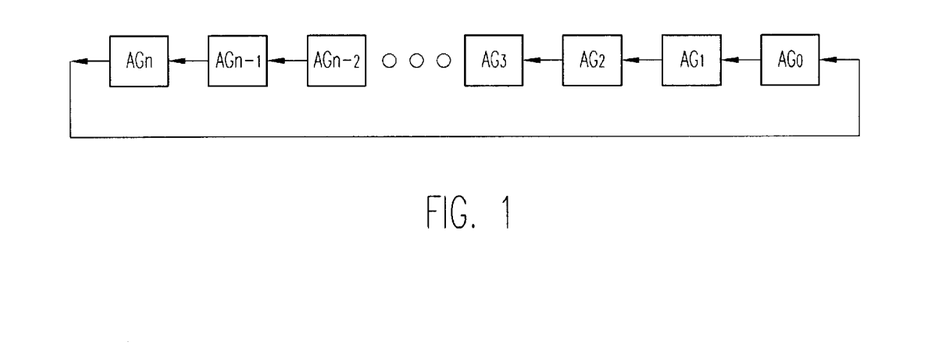
FIG. 1 is a diagram upon an enlarged scale of the address generator ring structure portion of the invention.

The before-described address generator ring structure of the address-generating system is illustrated in FIG. 1, having a plurality of subaddress generators $AG_O$ through $AG_n$ successively connected in a closed ring structure. For the previously described example, each subaddress generator will be capable of assigning addresses for 40 Gbps of input traffic data from the line cards or other data packet sources.

In accordance with the technique of the invention, the entire address assignment is divided into three parts: Packet Composition, Memory Allocation and Packet Decomposition. Packet Composition (FIG. 2) constructs the incoming data packets into "super packets" in which the packets are ordered based on time of arrival. The Memory Allocation (FIG. 3) is a sequential procedure from subaddress generator to subaddress generator along the addressing ring. ($AG_O$ to $AG_1$ to $AG_2$, etc. in FIG. 1). This allocates the continuous memory block for a super packet by assigning a starting address, and generates the starting address of the next super packet by adding the current super packet size to that starting address—then moving to the next subaddress generator of the ring. Finally, Packet Decomposition (FIG. 4) assigns the address of each packet in the super packet based on the arriving order. All the subaddress generators of the ring execute the Packet Composition and Packet Decomposition functions concurrently.

Figure 2:
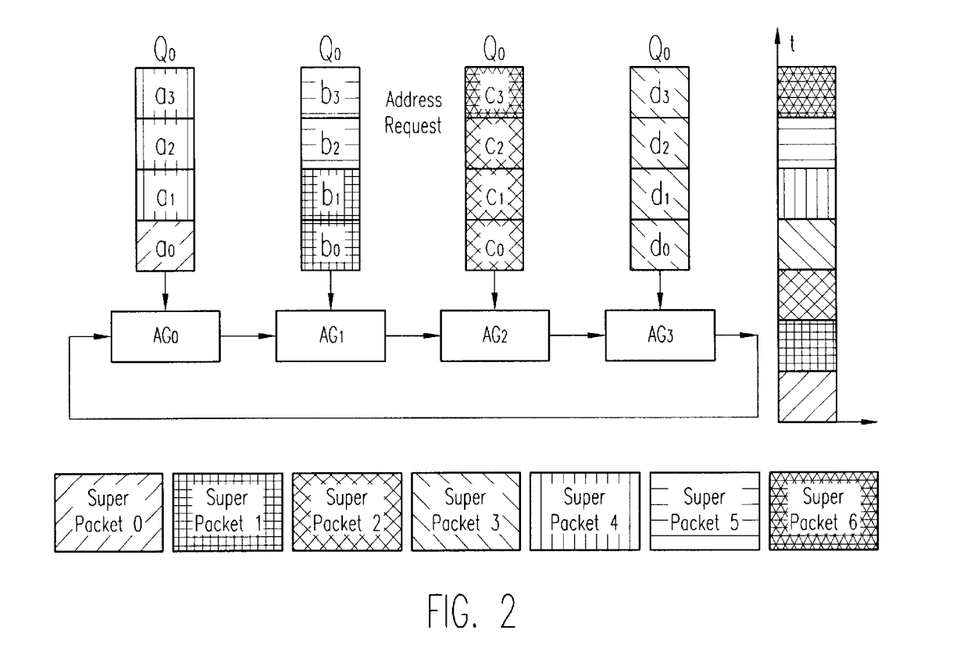
FIG. 2 is an explanatory diagram of the execution by all address generators of the ring structure of FIG. 1 of a packet composition functioning for a single queue, wherein super packets are composed or constructed of received data packets, ordered based on time of arrival.
Figure 3:
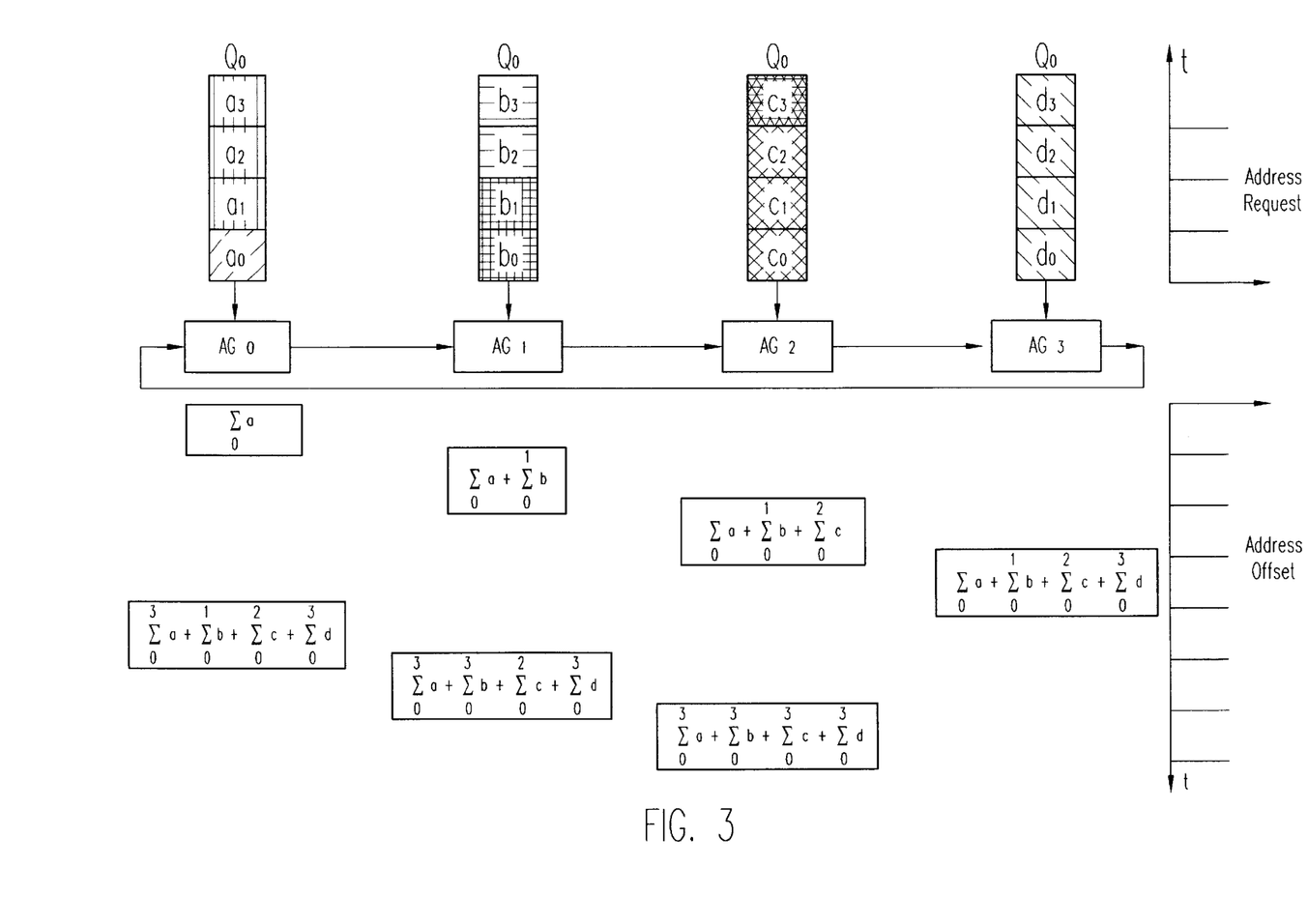
FIG. 3 shows the memory allocation assignment of memory space for each super packet, illustrating the adding of the super packet size to the previous super packet address for use as the starting address when the memory allocation moves to the next subaddress generator, the upper part of the diagram showing address requests, and the lower part, summation expressions illustrating the address offset passed to the next stage at successive time slots.
Figure 4:
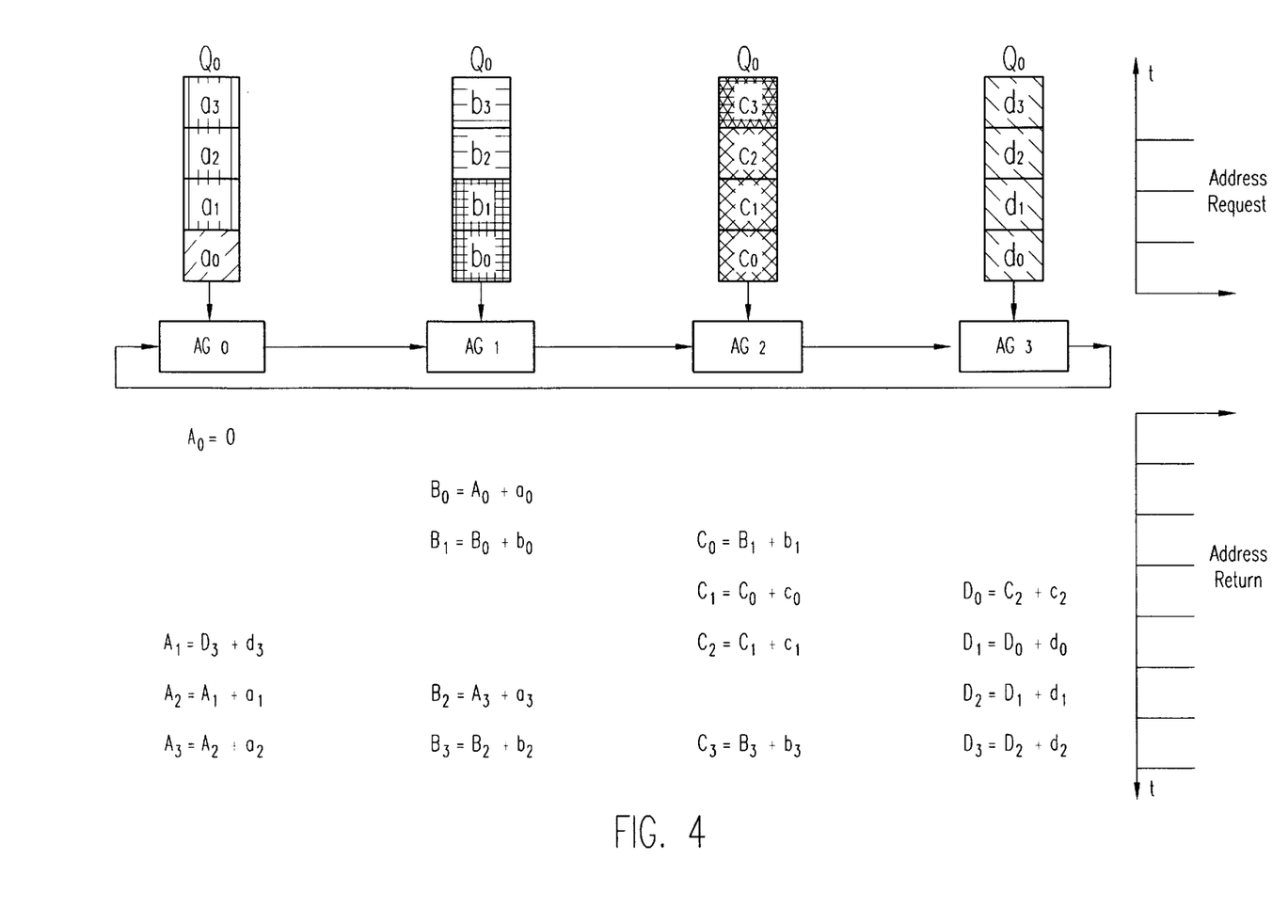
FIG. 4 is a similar diagram of a packet decomposition function of each subaddress generator, assigning addresses for individual packets in the super packet simultaneously, once the starting address for a super packet has been assigned by a subaddress generator.

As an example, consider the four subaddress generator ring $AG_O$, $AG_1$, $AG_2$, and $AG_3$ of FIGS. 2–4, in which each subaddress generator receives a new packet within address requests in four consecutive fixed time slots represented by respective composed or constructed super packet blocks $a_0$, $a_1$, $a_2$, and $a_3$; $b_0$, $b_1$, $b_2$, and $b_3$; $c_0$, $c_1$, $c_2$, and $c_3$; and $d_0$, $d_1$, $d_2$, and $d_3$; in the queues Qo. Referring to the time graph ("t") at the right in the figures, the Packet Composition and Memory Allocation function of FIGS. 2 and 3 starts from subaddress generator $AG_O$. At time slot 0, only one packet has shown up on subaddress generator $AG_O$, so the super packet contains only one packet. At time slot 1, each subaddress generator has received two packets, shown differentially shaded, composing or constructing the super packet. With the Memory Allocation starting from subaddress generator $AG_O$, when each subaddress generator receives said two-packet super packet, the Memory Allocation moves to subaddress generator $AG_1$, FIG. 3. As Memory Allocation moves along the address generator ring of FIG. 1, the packets that thus far are not yet in any super packets, form a new super packet—each super packet being shown with different shading. Thus Memory Allocation assigns memory space for each super packet. In this example, it assigns address 0 to super packet 0 and then adds the super packet size $a_o$ to the starting address, which is going to be used as starting address when Memory Allocation moves to the next subaddress generator. Specifically, at the before mentioned time slot 1, Memory Allocation moves to subaddress generator 1 and assigns a starting address, $$\sum_0 a,$$

to the super packet shaded in FIG. 2. It then adds the super packet size, $$\sum_0^1 b,$$

to the starting address, $$\sum_0 a,$$

forming the starting address for the next subaddress generator. Every time slot, it moves to the next subaddress generator along the address generator ring, adding the super packet size to the starting address as the starting address of the next subaddress generator. The figure therefore shows Memory Allocation for each subaddress generator for each time slot, and the starting address for the next subaddress generator.

Every time slot along the vertical time axis t, it moves to the next subaddress generator along the address generator ring. The summation blocks illustrate which subaddress generator is performing the memory allocation in each time slot, and the corresponding starting address for the next address generator.

As before stated, the Packet Composition of FIG. 2 and the earlier described Packet Decomposition of FIG. 4 occur concurrently. Turning, therefore, to the Packet Decomposition, as shown in FIG. 4, once the starting address for a super packet is assigned, Packet Decomposition at each subaddress generator assigns addresses for the individual packets in the super packet simultaneously. In this example, a lower-case letter ($a_o$, $b_o$, etc.) represents the packet and its size as before described, and the corresponding capital letter ($A_o$, $B_o$, etc.) is used to represent in FIG. 4 the address assigned to the individual packet of the super packet. The starting address of the first super packet in such address generator $AG_o$ is $A_o$=o, assigned to it as the only packet $a_o$, in this super packet and Packet Decomposition. The starting address $A_1$ of the second super packet in $AG_0$ is shown as $A_1=D_3+d_3$ which is assigned to packet $a_1$. The starting address plus the packet size of $a_1$ will be the address $A_2$ of the next packet $a_2$ in the same super packet, namely, $A_2=A_1+a_1$, and so on. Each packet of each super packet will get a unique address such that no two packets overlap and no holes or gaps will exist in the shared memory assigned between adjacent packets.

In the algorithmic philosophy thus far described, the Memory Allocation has moved to the next subaddress generator in the ring, every time slot. This, however, is not a requirement since the Memory Allocation period—i.e. the time between two continuous memory allocations at a subaddress generator—is proportional to the maximum size of a super packet. This property makes the parallel processing of address generating of the invention possible and the system scalable in terms of port or subaddress generator count. The latency from packet arrival to address return, however, will increase with the subaddress generator count.

Figure 5:
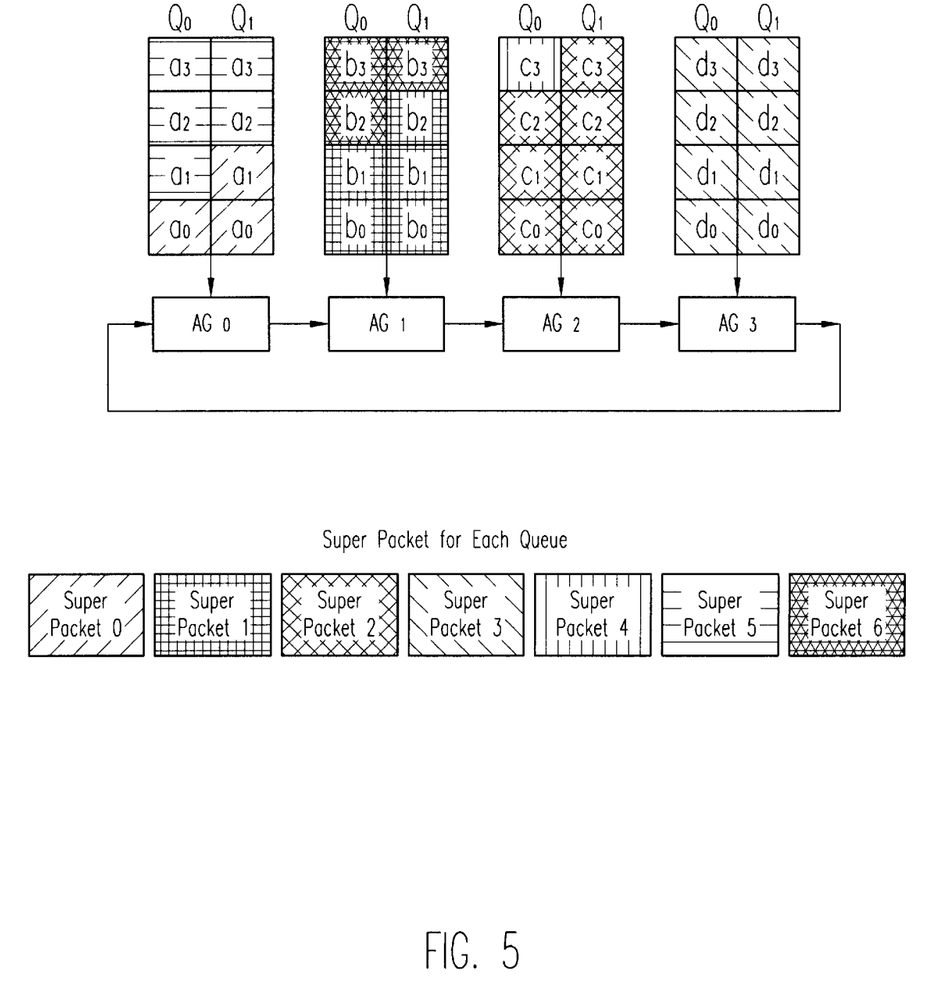
FIGS. 5, 6 and 7 correspond, respectively to FIGS. 3, 2 and 4, showing memory allocation for a multiple (two) queue system with address offset passed to the next stage (FIG. 5), packet composition of a two queue system (FIG. 6), and packet decomposition (FIG. 7) of such a two queue system, respectively.
Figure 6:
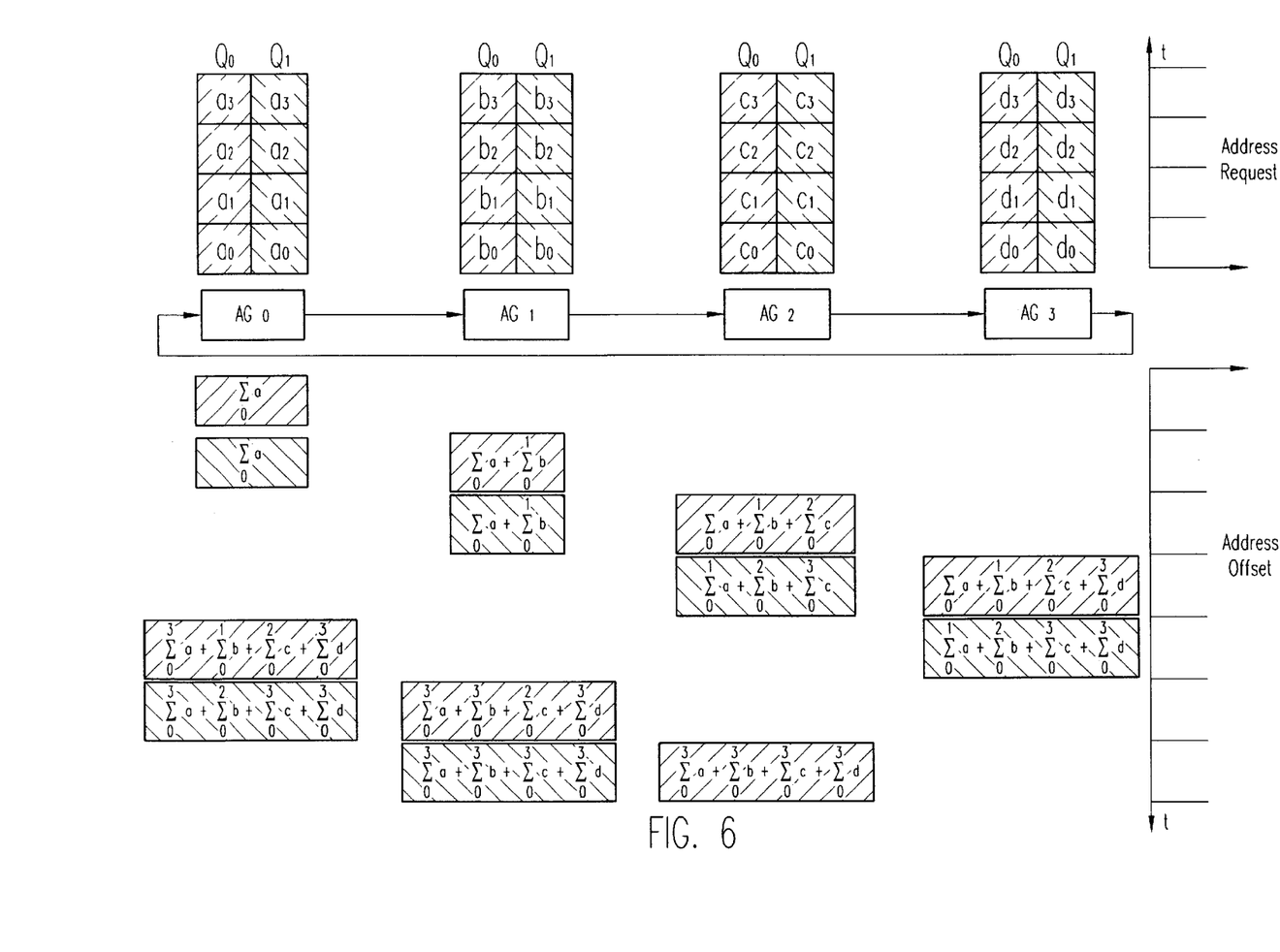
Figure 7:
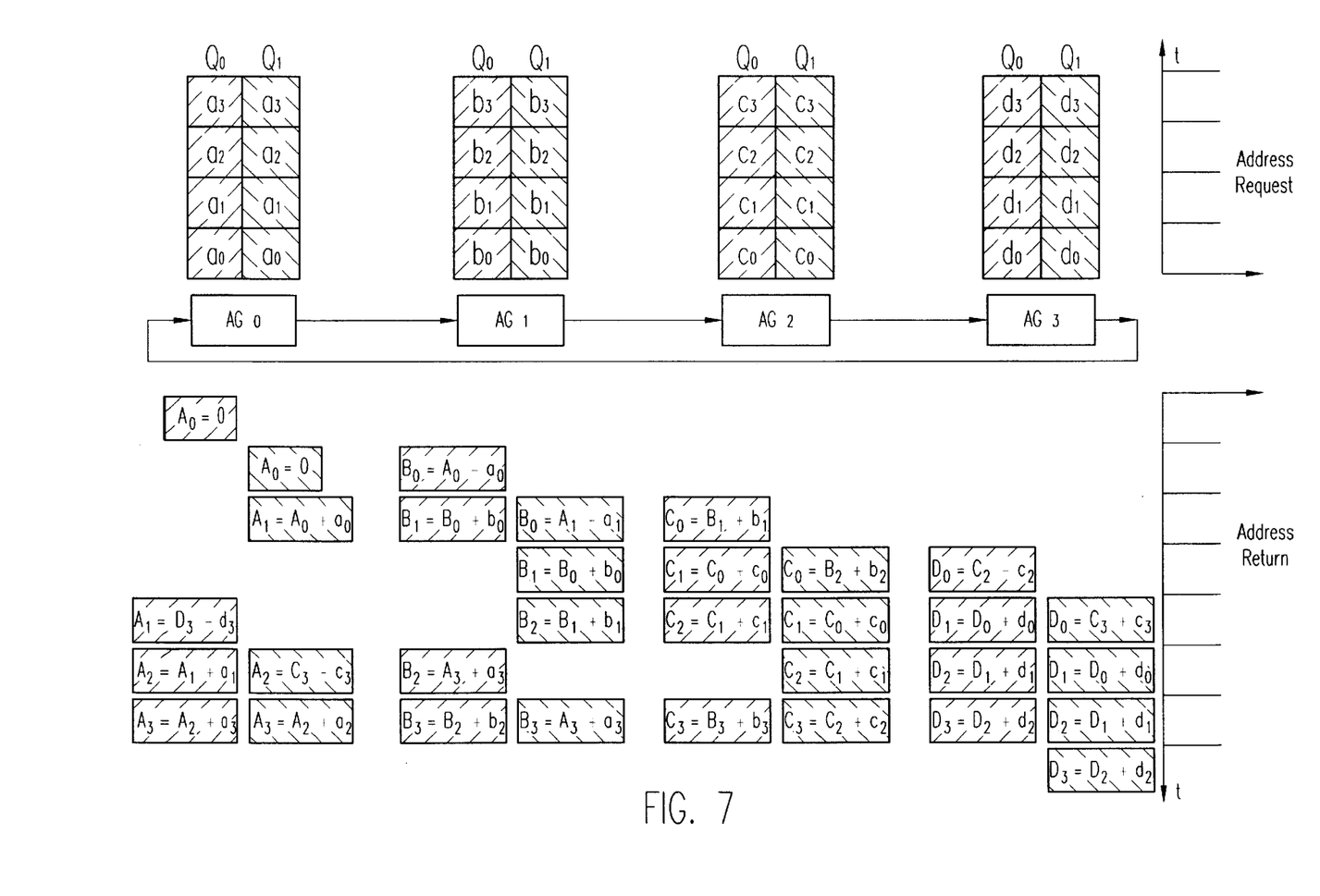

The previously described operation, furthermore, has been illustrated for the case of single queue $Q_0$ for Packet Composition and Packet Decomposition. As before indicated, however, multiple queue systems may also be similarly used, FIGS. 6, 5 and 7 showing Packet Composition, Memory Allocation and Packet Decomposition respectively for multiple queues—in this illustration, a two-queue system illustrating the same algorithmic approach as for the single queue systems of respective FIGS. 2, 3 and 4, detailed above. Many identical address generators may, indeed, be used, each corresponding to a data queue and each starting at different time slots.

In the illustrative two-queue system ($Q_0$, $Q_1$) of FIGS. 6, 5 and 7, the input pattern to each queue will be identical to the previously described operation. The Memory Allocation of FIG. 5 starts with $Q_0$, at time slot 0, and $Q_1$, (differently shaded) at time slot 1. While, moreover, the input pattern of both queues is identical, the super packets of each queue will be different as more particularly shown in FIG. 6. As for the Packet Decomposition of such a multiple queue system (FIG. 7), the method of assigning addresses to the individual packets of a super packet will be the same as described in connection with FIG. 4 for the single queue system. The use of more queues, of course, will result in a larger Memory Allocation period. This, of course, implies that the maximum size and packet and address-assignment latency will increase. In the approach of the method of the invention, as earlier noted, the rate of Packet Decomposition, however, has to match the rate of Packet Composition.

It is now in order to treat with the overall architecture of the address generating system AGS of the invention addressing the before-described preferred non-blocking shared memory output-buffered data switching system M, as of the type of said copending application and represented in FIG. 8. For illustration purposes, two input or ingress ports A and C are shown at the left, with received data packets to be sent to the output or egress port B at the far right. Qn and Qn+1 queues in the shared memory M are illustratively shown dedicated to the output port B.

In operation, received packets AP1 and AP2 arrive from line cards sequentially at input port A. These packets are destined for queue Qn in the shared memory dedicated to output port B. The independently received packet CP1 and CP2 arrive sequentially at input port C, destined for queue Qn in the shared memory. The input port A makes a request for an address to the address-generating system AGS of the invention, earlier described, for illustrative packets AP1 and packet AP2, as described in said copending application.

Similarly, ingress port C makes request for an address to AGS for packets CP1 and CP2. These packets AP1, AP2, CP1 and CP2 can be of different sizes.

The address requests can happen simultaneously or in any order, and the address generator AGS of the invention processes these requests from port A in the required time and generates addresses A1 and A2 for input port A in the manner before detailed, and processes the requests from port B also in the required time, generating addresses C1 and C2 for input port C.

The addresses A1, A2 are returned to input port A and the addresses C1 and C2 are independently returned to input port C and this can happen in any order. Packets AP1 and AP2 which are waiting at input port A to get their addresses now travel to the shared memory M with their corresponding address tags of A1 and A2; and similarly, Packets CP1 and CP2 which are waiting at port C to get their addresses, now travel to the shared memory with their corresponding address tags of C1 and C2. The shared memory system carries these packets in non-blocking fashion and these packets are stored in queue Qn dedicated to output port B, completing the write operation of packets into the shared memory as more fully detailed in said copending application.

The addresses A1, A2 and C1, C2 need not be contiguous addresses in Qn since there can be packets from other input or ingress ports that may occupy the regions between A1, A2, C1, C2. The output or egress port B is programmed to drain queue Qn based on its bandwidth allocation –20% as illustrated in this example of FIG. 8. According to this rate, the output port B makes a data request for data from queue Qn and the shared memory subsystem M returns appropriate data from queue Qn in appropriate time to the output port B. Other egress ports may also be active simultaneously with the shared memory handling of all these read requests appropriately. In due time, packets AP1, AP2, CP1, CP2 are drained out by the output port B, completing their intended travel from input ports A and C to output port B as per allocated bandwidth of Qn for output port B. This system performs these operations for 64 OC-192 in current experimental implementation of the assignee of the present invention, but the scheme, as before explained, is scalable with existing semiconductor technology and to more than 64 OC-192 ports.

Further modifications will also occur to those skilled in this art, and such are considered to fall within the spirit and scope of the invention as defined in the appended claims.

What is claimed is:

1. A method of addressing sequential data packets from a plurality of input data line cards to enable their memory storage in successive shared memory block sections of an output-buffered switch fabric, each assigned to a queue dedicated for an output port, that comprises, connecting a plurality of similar subaddress generators successively in a closed ring structure, with each subaddress generator being capable of assigning addresses for predetermined size data byte packets of input data traffic received in a plurality of successive time slots to produce packet composition into super packets that are ordered based on time of arrival; allocating a continuous memory block for a super packet by assigning an initial super packet address in the destination queue from a subaddress generator; thereupon generating the starting address of the next super packet by adding the super packet size to said initial starting address and moving to the next subaddress generator sequentially along the successive subaddress generators of the ring, thereby sequentially allocating memory in the shared memory sections from subaddress generator to subaddress generator along said ring; and, upon the assigning of an address to each super packet, producing packet decomposition at the corresponding subaddress generator by simultaneously assigning addresses for the individual packets in the super-packet, based on their arrival order.

2. The method in of claim 1 wherein all subaddress generators are operated to execute their respective said packet composition and packet decomposition concurrently.

3. The method of claim 1 wherein the packets are written into the shared memory sections such that there is no overlap among the packets and no holes between adjacent packets.

4. The method of claim 1 wherein said memory allocating moves to the next subaddress generator every time slot.

5. The method of claim 1 wherein said memory allocating moves to the next subaddress generator after an allocation time period of more than one time slot, with said time period being proportional to the maximum size of a super packet.

6. The method of claim 5 wherein parallel processing of address generating is effected, with scalability in terms of subaddress generators, port counts, and bandwidth.

7. The method of claim 1 wherein in all super packets, each packet is provided with a unique address such that no two packets overlap and no holes exist in the shared memory between adjacent packets.

8. The method of claim 3 wherein the rate of said packet decomposition matches the rate of said packet composition.

9. The method of claim 2 wherein 64 OC192 (10 Gbps) I/O ports are supported, and 40 byte packets are received from the line cards every 40 ns.

10. The method of claim 9 wherein the address assigning capability extends for 64 packets every 40 ns as when all packets belong to the same queue.

11. In a system for addressing sequential data packets from a plurality of input data line cards to enable their memory storage in successive shared memory block sections of an output-buffered switch fabric, each assigned to a queue dedicated for an output port, an address generator having, in combination with said system, a plurality of similar subaddress generators successively connected in a closed ring structure and each capable of assigning addresses for predetermined size byte packets of input data traffic received in a plurality of successive time slots, to produce packet composition into super packets that are ordered based on time of arrival; means for sequentially allocating memory in the shared memory sections from subaddress generator to subaddress generator along said ring by allocating a continuous memory block for a super packet by assigning an initial starting address in a destination queue from a subaddress generator, and thereupon generating the starting address of the next super packet by adding the super packet size to said initial starting address, and moving to the next subaddress generator sequentially along the subaddress generator ring; and packet decomposing means operable upon the assigning of an address for each super packet, for simultaneously assigning addresses for the individual packets in the super packet, based on their arrival order.

12. The address generator of claim 11 wherein all subaddress generators are operated to execute their respective packet composition and packet decomposition concurrently.

13. The address generator of claim 11 wherein the packets are written into the shared memory sections such that there is no overlap among the packets and no holes between adjacent packets.

14. The address generator of claim 11 wherein said memory allocating means moves to the next subaddress generator every time slot.

15. The address generator of claim 11 wherein said memory allocating means moves to the next subaddress generator after an allocation time period of more than one time slot, with said time period being proportional to the maximum size of a super packet.

16. The address generator of claim 15 wherein parallel processing address generating is effected, with scalability in terms of subaddress generators, port counts and bandwidth.

17. The address generator of claim 11 wherein in all super packets, each packet is provided with a unique address such that no two packets overlap and no holes exist in the shared memory between adjacent packets.

18. The address generator of claim 12 wherein the rate of said packet decomposition matches the rate of said packet composition.

19. The address generator of claim 12 wherein 64 OC192 (10 Gbps) I/O ports are supported, and 40 byte packets are received from the line cards every 40 ns.

20. The address generator of claim 19 wherein the address assigning capability extends for 64 packets every 40 ns, as when all packets belong to the same queue.

21. An address generator for addressing sequential data packets to enable their storage, having, in combination, a plurality of similar subaddress generators successively connected in a closed ring structure and each capable of assigning addresses for predetermined size byte data packets received in a plurality of successive time slots, producing packet composition into super packets that are ordered, based on time of arrival; means for sequentially allocating memory from subaddress generator to subaddress generator along said ring for a super packet by assigning an initial starting address in a destination queue from a subaddress generator, and thereupon generating the starting address of the next super packet by adding the super packet size to said initial starting address, and moving to the next subaddress generator sequentially along the subaddress generator ring; and packet decomposing means operable upon the assigning of an address for each super packet, for simultaneously assigning addresses to the individual packets in the super packet, based on their arrival order.

22. The method of addressing sequential data packets to enable their memory storage, that comprises, connecting a plurality of similar subaddress generators successively in a closed ring structure, with each subaddress generator being capable of assigning addresses for predetermined size data byte packets of input data traffic received in a plurality of successive time slots to produce packet composition into super packets that are ordered based on time of arrival; allocating a continuous memory block for a super packet by assigning an initial starting address in a destination queue from a subaddress generator; thereupon generating a starting address for the next super packet by adding the super packet size to the said initial starting address, and moving to the next subaddress generator sequentially along the subaddress generator ring; and, upon the assigning of an address for each super packet, producing packet decomposition at the corresponding subaddress generator by simultaneously assigning addresses for the individual packets in the super packet, based on their arrival order.

23. The method of claim 22 wherein all subaddress generators are operated to execute their respective said packet composition and packet decomposition concurrently.

24. An electronic data switch fabric system for receiving and outputting a plurality of data traffic streams to be switched by the fabric from data traffic line card input ports to output ports, having, in combination, shared memory sections assigned in the fabric to the data queues and with output buffering of the data switched to the output ports; an address generator for addressing sequential data packets from a plurality of input data line cards to enable their memory storage in successive shared memory block sections of the output-buffered switch fabric, each assigned to a queue dedicated for an output port; the address generator having a plurality of similar subaddress generators successively connected in a closed ring structure and each capable of assigning addresses for predetermined size byte packets of input data traffic received in a plurality of successive time slots, to produce packet composition into super packets that are ordered based on time of arrival; means in the address generator for sequentially allocating memory in the shared memory sections from subaddress generator to subaddress generator along said ring by allocating a continuous memory block for a super packet by assigning an initial starting address in a destination queue from a subaddress generator, and thereupon generating the starting address of the next super packet by adding the super packet size to said initial starting address, and moving to the next subaddress generator sequentially along the subaddress generator ring; packet decomposing means operable upon the assigning of an address for each super packet, for simultaneously assigning addresses for the individual packets in the super packet, based on their arrival order; means for applying the addresses to the respective input data packets to enable their storage in corresponding sections of the shared memory and in the corresponding queues dedicated to the respective output ports.

25. A sequential data packet addressing method, particularly adapted for shared memory output-buffered switch fabrics and related memories, that comprises, using a ring of successive subaddress generators to each assign addresses for predetermined size data byte packets received in successive time slots; creating therefrom super packets ordered based on arrival time; sequentially allocating memory therefor in the shared memory without overlap among the packets and with no holes between adjacent packets; and assigning addresses for the individual packets in the super packets upon the assigning of an address in the memory for each super packet.

* * * * *